T. W. VICKERS.
REPAIR DEVICE FOR PNEUMATIC TIRES.
APPLICATION FILED SEPT. 10, 1913.
1,115,622.
Patented Nov. 3, 1914.
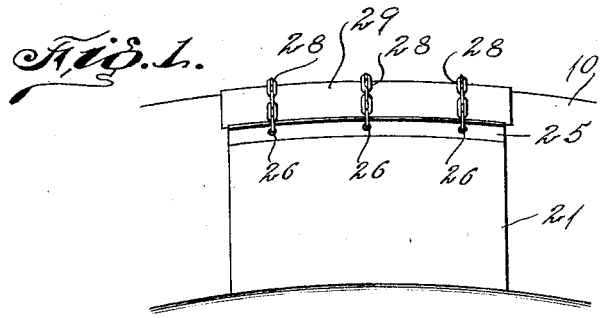
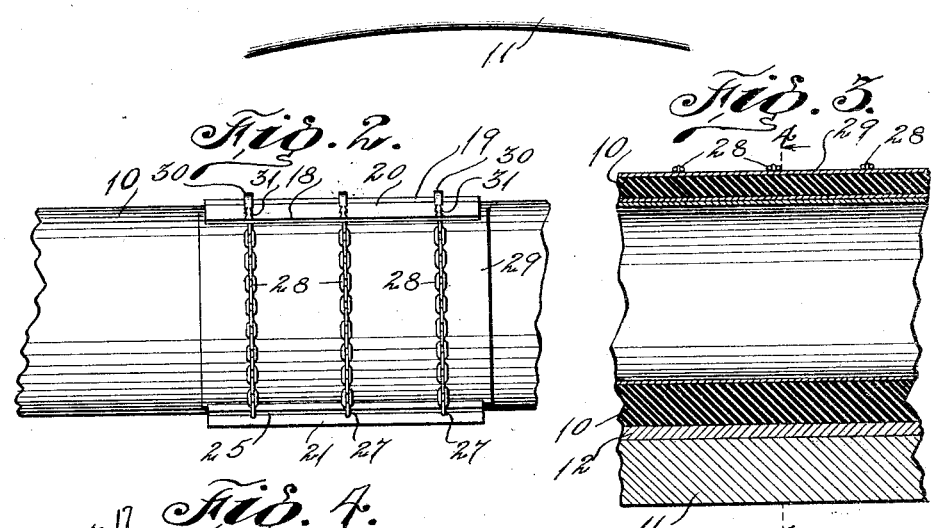
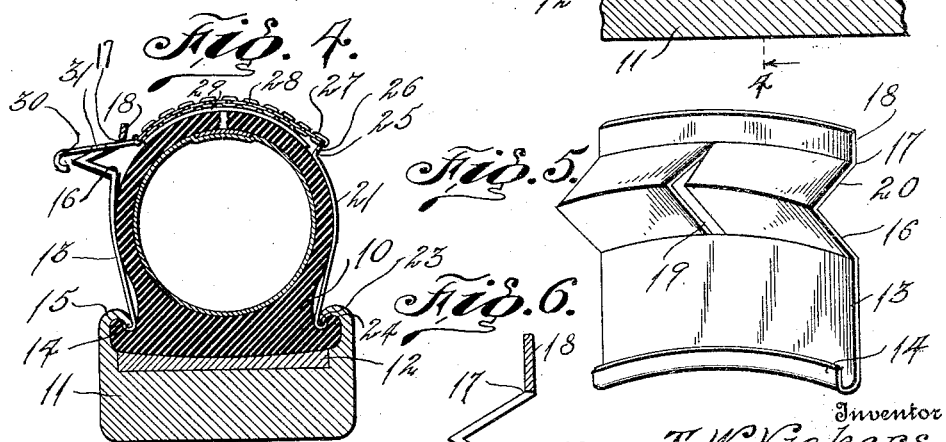
Witnesses
Jos. L. Gregory
H. M. Fert.
Inventor
T. W. Vickers
By
Attorneys

UNITED STATES PATENT OFFICE.

THEODORE W. VICKERS, OF SILVER PEAK, NEVADA.

REPAIR DEVICE FOR PNEUMATIC TIRES.

1,115,622.      Specification of Letters Patent.      Patented Nov. 3, 1914.

Application filed September 10, 1913. Serial No. 789,149.

*To all whom it may concern:*

Be it known that I, THEODORE W. VICKERS, a citizen of the United States, residing at Silver Peak, in the county of Esmeralda, State of Nevada, have invented certain new and useful Improvements in Repair Devices for Pneumatic Tires; and I do hereby declare the following to be a full, clear, and exact description of the invention, such as will enable others skilled in the art to which it appertains to make and use the same.

This invention relates to improvements in repair devices for pneumatic tires.

The principal object of the invention is to provide a simple device which may be quickly attached to a deflated punctured or blown out tire to hold a temporary repair patch on the outer face of the tread surface of the tire.

Other objects and advantages will be apparent from the following description and with particular reference to the accompanying drawings.

In the drawings: Figure 1 is a side elevation of a portion of the tire and rim showing my invention in position, Fig. 2 is a plan view of the same, Fig. 3 is a vertical longitudinal sectional view through the tire, Fig. 4 is a vertical transverse sectional view on the line 4—4 of Fig. 3, Fig. 5 is a perspective view of the slotted plate, and Fig. 6 is an enlarged sectional detail of a portion of the slotted plate.

Referring particularly to the drawings, 10 represents a pneumatic tire of the "clencher type," which is adapted to be secured in the clencher rim 11, said rim having the movable ring section 12 as ordinarily used. Disposed on the outside of the tires, that is on the side of the tires farthest away from the vehicle is a vertically extending plate 13 which is slightly curved to conform to the contour of the tire, the lower end of said plate having a curved lip 14 for interlocking engagement with the lip 15 on that side of the rim of the wheel. The other end of the plate 13 is bent into a transversely extending V-shaped channel 16, the terminal of the plate being bent at 17 to form a flange 18. Formed through the plate 13 and in the walls of the channel 16 are the elongated openings 19, the upper portion 20 of which are upwardly tapered or V-shaped as shown.

Disposed on the opposite side of the tire is a plate 21 also having a curved lip 23 for engagement with the lip 24 of the removable rim 11 of the wheel. The upper end of the plate 21 extends at an obtuse angle to form a flange 25, which flange is provided with a plurality of openings 26, said openings being in number the same as the elongated openings 19. Secured in the openings 26 are the rings 27 each having attached to it a series of links of a chain 28. These chains vary in number, according to the number of openings in the plates 19 and 21, which are regulated by the size of the rent of the tire, and are adapted to be extended across the tread of the tire and to hold to the tire a leather patch 29, which patch is placed over the opening or rent in the tire. On the opposite end of each of the chains 28 is a hook or clamping member 30, said member being circular in cross section and formed with a plurality of circumferential notches 31, which notches will readily escape the sides of the openings 19, but when the said member 30 is raised into the V-shaped portion 20 of the openings, the notches will engage with the sides of said openings and prevent disengagement therefrom. On the free end of the member 30 is a hook-shaped portion 32 which is adapted to be grasped by the fingers by pulling or straining the chain across the tread of the tire.

In repairing a tire with my device, the tire being deflated, the plate 13 is interlocked with the rib or lip of the rim, after which the plate 21 is engaged with the lip of the rim 12, said rim being slipped into place as in the ordinary manner of fastening on the common clencher rims. The leather plate 29 is then placed over the rent or opening in the tire, on the outer face of the tread surface, and the chains 28 drawn across the tire and over the leather plate 29. The members 30 are then pulled to draw the chains tight and the notches 31 engaged in the V-shaped portions of the openings of the plate 13, whereby the plate 29 is firmly held against the tire, and a temporary repair accomplished, so that the vehicle may proceed on its way to the nearest place to have the tire permanently repaired.

As an additional feature in applying the patch to the tire I place a sheet 33 formed of rubber or canvas between the inner tube of the tire, and the outer casing directly under the rent in the tire. When the tire is inflated this piece of rubber or canvas is forced up against the opening from within by the distention of the inner tube, thus effectively providing a repair patch which will last and hold the tire inflated for a considerable length of time.

What is claimed is:

1. A device for holding a patch on a pneumatic tire comprising a pair of rim engaging members, one of said members having an apertured flange, chains secured to the flange and extending across the tread of the tire, the other of the members having V-shaped openings, and notched members on the free ends of the chains for locking engagement in the V-shaped openings.

2. A device for holding a patch on a pneumatic tire comprising flange plates disposed on opposite sides of the tire, means on the plates for interlocking engagement with the rim of the wheel, the flange of one of the plates having a plurality of openings, chains each secured at one end in one of the said openings, the other of the said plates having a plurality of elongated and tapering openings in the flange thereof, clamping members provided with finger gripping portions secured to the ends of the chains, and notches on the clamping members for engagement within the tapered openings, whereby the chains are strained across the tread of the tire and over the patch.

In testimony whereof, I affix my signature, in presence of two witnesses.

THEODORE W. VICKERS.

Witnesses:
C. L. HANNAMAN,
J. E. C. WILLIAMS.

Copies of this patent may be obtained for five cents each, by addressing the "Commissioner of Patents, Washington, D. C."